(12) United States Patent
Charier et al.

(10) Patent No.: US 6,289,670 B1
(45) Date of Patent: Sep. 18, 2001

(54) TURBOJET ENGINE THRUST REVERSER AND EXHAUST NOZZLE

(75) Inventors: Gilles Alain Charier, La Grande Paroisse; Xavier Jean-Michel André Guyonnet, Fontainebleau; Gilles Louis Rollin, Blandy les Tours, all of (FR)

(73) Assignee: SNECMA Moteurs, Paris (FR)

( * ) Notice: Subject to any disclaimer, the term of this patent is extended or adjusted under 35 U.S.C. 154(b) by 0 days.

(21) Appl. No.: 09/479,077

(22) Filed: Jan. 7, 2000

(30) Foreign Application Priority Data

Jan. 14, 1999 (FR) .................................................. 99 00293

(51) Int. Cl.[7] ...................................................... F02K 1/00
(52) U.S. Cl. ............................................. 60/230; 60/226.2
(58) Field of Search .................................... 60/226.2, 230, 60/262; 239/265.29

(56) References Cited

U.S. PATENT DOCUMENTS

| | | | |
|---|---|---|---|
| 2,944,394 | * 7/1960 | Peregrine | ............................ 60/35.54 |
| 3,068,646 | * 12/1962 | Fletcher | ................................ 60/35.6 |
| 4,641,782 | 2/1987 | Woodward . | |
| 4,790,495 | * 12/1988 | Greathouse et al. | ............. 244/110 B |
| 4,916,895 | * 4/1990 | Dubois | ................................ 60/226.2 |
| 5,050,803 | 9/1991 | Wakeman et al. . | |
| 5,201,800 | 4/1993 | Wolf . | |
| 5,347,808 | * 9/1994 | Standish et al. | ..................... 60/226.2 |
| 5,392,991 | * 2/1995 | Gatti et al. | ....................... 239/265.29 |
| 5,779,192 | * 7/1998 | Metezeau et al. | ................... 60/226.2 |
| 5,915,651 | * 6/1999 | Asaki et al. | ...................... 244/110 B |

FOREIGN PATENT DOCUMENTS

0761947 A1   3/1997 (EP) .
WO 97/48600  12/1997 (WO) .

* cited by examiner

*Primary Examiner*—Charles G. Freay
*Assistant Examiner*—W. Rodriguez
(74) *Attorney, Agent, or Firm*—Bacon & Thomas, PLLC

(57) ABSTRACT

An integrated exhaust nozzle and thrust reverser for a turbojet engine is provided. The exhaust nozzle comprises an exhaust duct situated within a fairing (9), a set of hot flaps (14) at a downstream end of the duct, a set of cold flaps (16) at a downsteam end of the fairing (9), and a thrust reverser (30). The thrust reverser comprises two eyelids (31, 32) which are movable between a thrust reversal position wherein they project into the duct and a forward-thrust position. In a takeoff mode, the eyelids (32, 33) are moved away from each other by one or more actuators (50) acting on arms (33, 34) pivotably connected to the eyelids (31, 32). Movement of the eyelids (31, 32) from the reverse-thrust position to the forward-thrust position, or vice-versa, is implemented by control actuators (35, 36).

27 Claims, 7 Drawing Sheets

TURBOJET ENGINE THRUST REVERSER AND EXHAUST NOZZLE

BACKGROUND OF THE INVENTION

1. Field of the Invention

The invention relates to a turbojet engine exhaust nozzle mounted on a civilian supersonic aircraft and comprising a thrust reverser.

More specifically, the invention relates to a turbojet engine exhaust nozzle mounted on a supersonic aircraft and comprising an exhaust duct defined within an external cowling, a set of hot flaps mounted in a pivotable manner on the end of said duct, a set of cold flaps mounted in a pivotable manner on a downstream end of the cowling, a thrust reverser comprising two identical eyelids mounted in a pivotable manner downstream of the exhaust duct on either side of an axial plane of symmetry, means for controlling the hot and the cold flaps depending on the flight mode, and means for driving the eyelids from an inactive to an active position or vice-versa.

2. Description of the Related Art

The eyelids of such an exhaust nozzle are each mounted on a stationary structure so as to be pivotable about a transverse axis near the axial plane of symmetry in order to regulate the exhaust cross-section of the engine's exhaust gases as a function of the flight modes. However, this cross-section varies only slightly. On the other hand, noise standards for aircraft in the vicinity of civilian airports require lowering the gas exhaust speeds, especially at takeoff.

These standards require special designs because the engine at takeoff is at full power and the gas flows are substantial.

SUMMARY OF THE INVENTION

The objective of the invention is to provide an exhaust nozzle of the above described kind which reduces noise at takeoff while increasing the gas exhaust cross section.

This goal of the invention is attained by an exhaust nozzle comprising a control mechanism which, in the takeoff mode, moves the two eyelids away from the axial plane of symmetry.

Moreover, the following design steps are taken:

- the cold flaps are driven to ensure an obstruction-free, aerodynamic profile with the two eyelids in both the takeoff and the cruise modes;
- the cold flaps are linked to the hot flaps by linkrods;
- the two eyelids hinge on the ends of two lateral pairs of arms and on the ends of at least one pair of actuators, the arms of each pair of arms and the actuators of each pair of actuators being configured symmetrically relative to the axial plane of symmetry and hinging at their other ends on a stationary structure, and the actuators comprising the control mechanism for the eyelids;
- the control mechanism moving the eyelids comprises an actuator connected between the arms of at least one of the pairs of arms;
- the two arms of at least one of the pairs of arms are connected by sector gears to assure symmetrical displacement of the eyelids on the arms relative to the axial plane of symmetry;
- the actuators comprising the control mechanism for the eyelids may be actuated in an opposing manner in the takeoff mode in order to slightly deflect the gas flow.

BRIEF DESCRIPTION OF THE DRAWINGS

Other advantages and features of the invention are elucidated in the following illustrative description, with reference to the attached drawings, in which.

DETAILED DESCRIPTION OF THE PREFERRED EMBODIMENT

Figure 1:
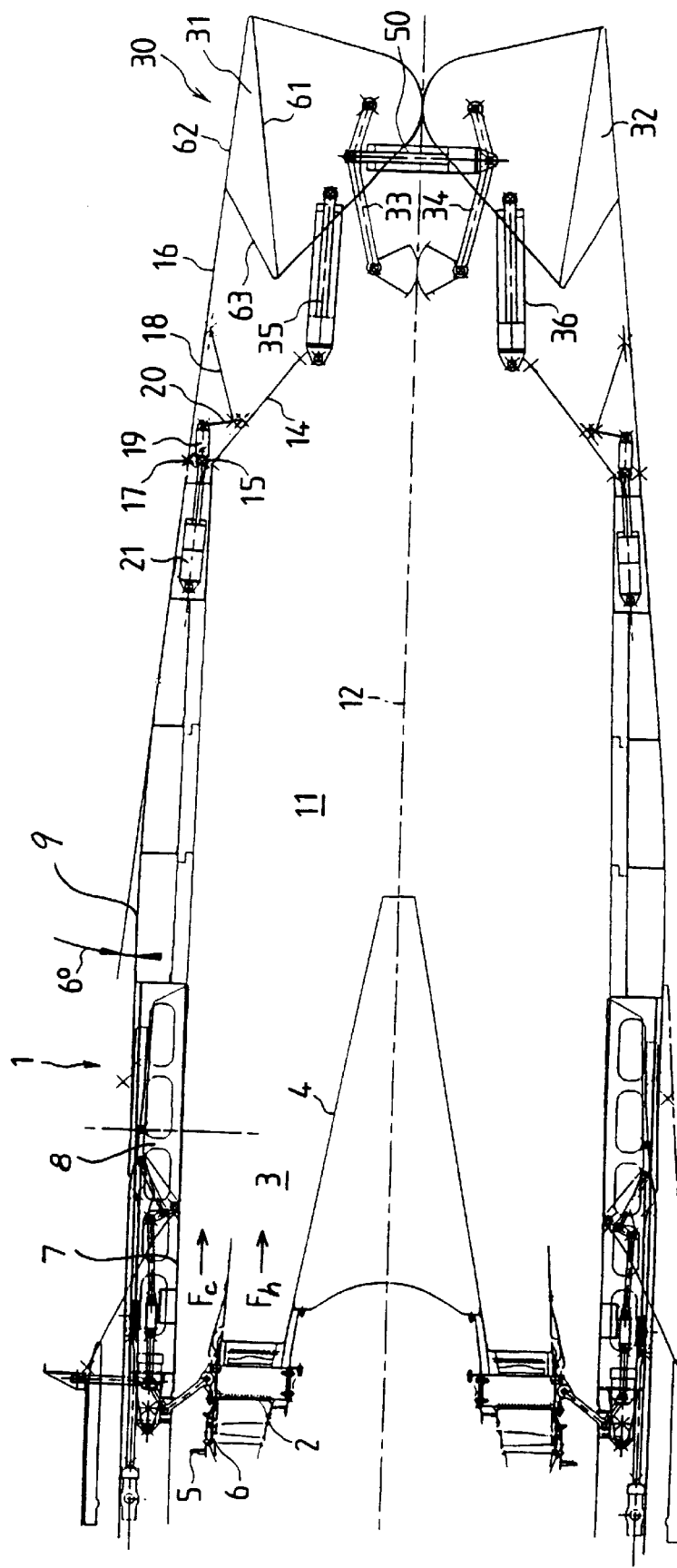
FIG. 1 is a cross-section in a vertical plane of symmetry of an exhaust nozzle of a turbojet engine mounted on a supersonic aircraft according to a first embodiment of the invention in a cruise mode.

The drawings show an exhaust nozzle 1 for the gases issuing from a bypass, double barrel turbojet engine mounted on a civilian supersonic aircraft.

A turbine 2 of this turbojet engine emits a hot flow $F_h$ an annular space 3 enclosing a cone 4 of the turbine 2. A cold flow $F_c$ issues from an annular duct 5 enclosing an external casing 6 of the turbine 2. The annular duct 5 is externally bounded by an inner annular wall 7 extending in a downstream direction, in the direction of flow of the gases, and beyond the end of the cone 4. The inner wall 7 is part of a stationary, annular structure 8 which is externally bounded by an aerodynamic fairing 9 so as to comprise an external cowling.

Figure 3:
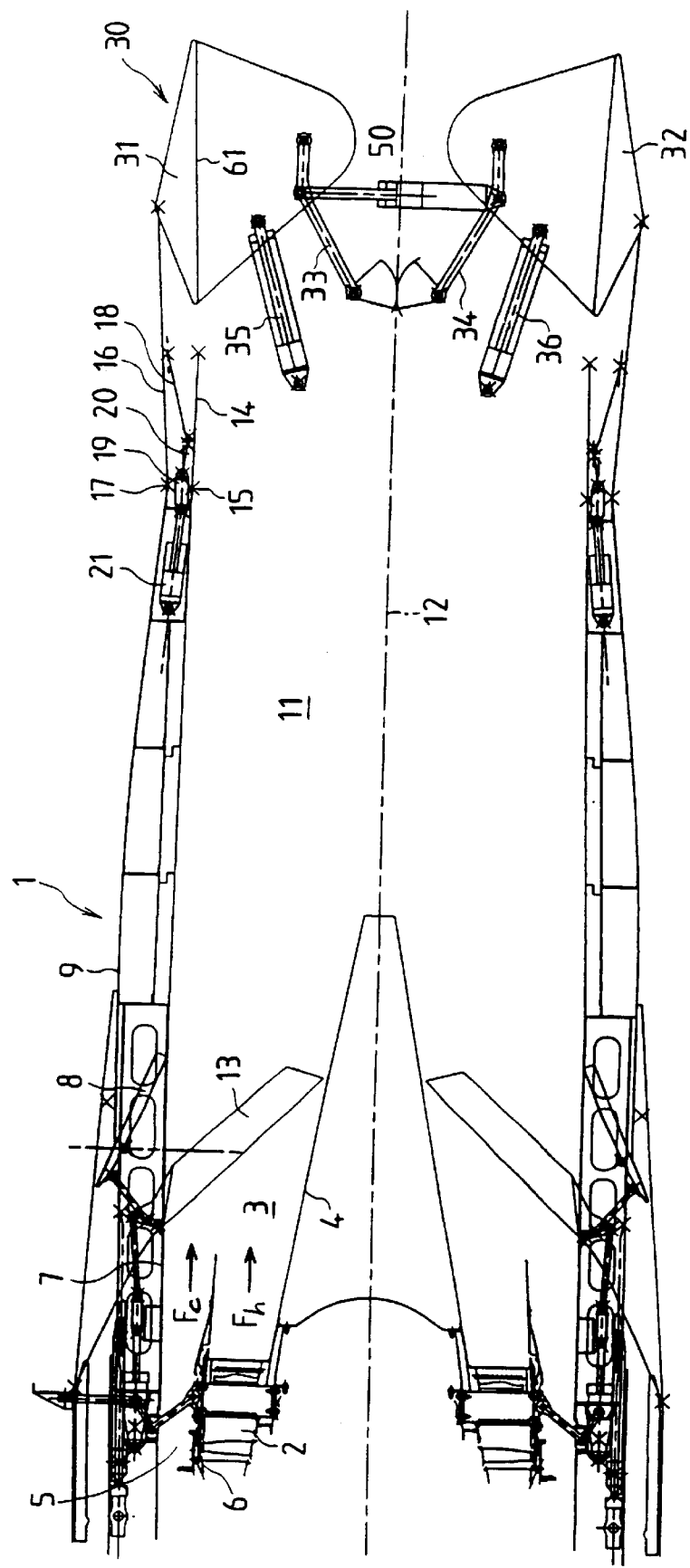
FIG. 3 is a cross-section in the vertical plane of symmetry of the exhaust nozzle of FIG. 1 in a takeoff mode.

The inner wall 7 of the stationary structure 8 bounds an inner cylindrical chamber 11 with an axis of revolution 12 coinciding with the axis of the turbojet engine. The hot flow $F_h$ issuing from the turbine and the cold flow $F_c$ issuing from the annular duct 5 are mixed in the chamber 11, in particular by a mixer with lobes 13 such as are shown in FIG. 3 (shown retracted in FIG. 1). The resulting gaseous mixture may be enriched with fuel by injection manifolds and afterburned in the inner chamber 11 in order to boost the turbojet engine thrust. in particular during takeoff.

Hot flaps 14 hinge on a downstream end 15 of the inner wall 7 and cold flaps 16 hinge on a downstream end 17 of the fairing 9. The downstream ends 15 and 17 are situated substantially in the same plane transverse to the axis 12.

The cold flaps 16 are preferably connected to the hot flaps by linkrods 18. The hot flaps 14 are connected by linkrods 20 to a control ring 19. The control ring 19 is arranged in an annular space between the inner wall 7 and the fairing 9 and is displaced parallel to the axis 12 by a plurality of synchronized control actuators 21 anchored on the stationary structure 8.

Because of the linkrods 18, the displacements of the cold flaps 16 are made to follow the displacements of the hot flaps 14. The hot flaps 14 are driven by the actuators 21 as a function of the flight modes between a maximally convergent position, namely in the cruise mode shown in FIGS. 1 and 2, and a substantially cylindrical position, namely in the takeoff and landing configurations shown in FIGS. 3 through 7.

Figure 2:
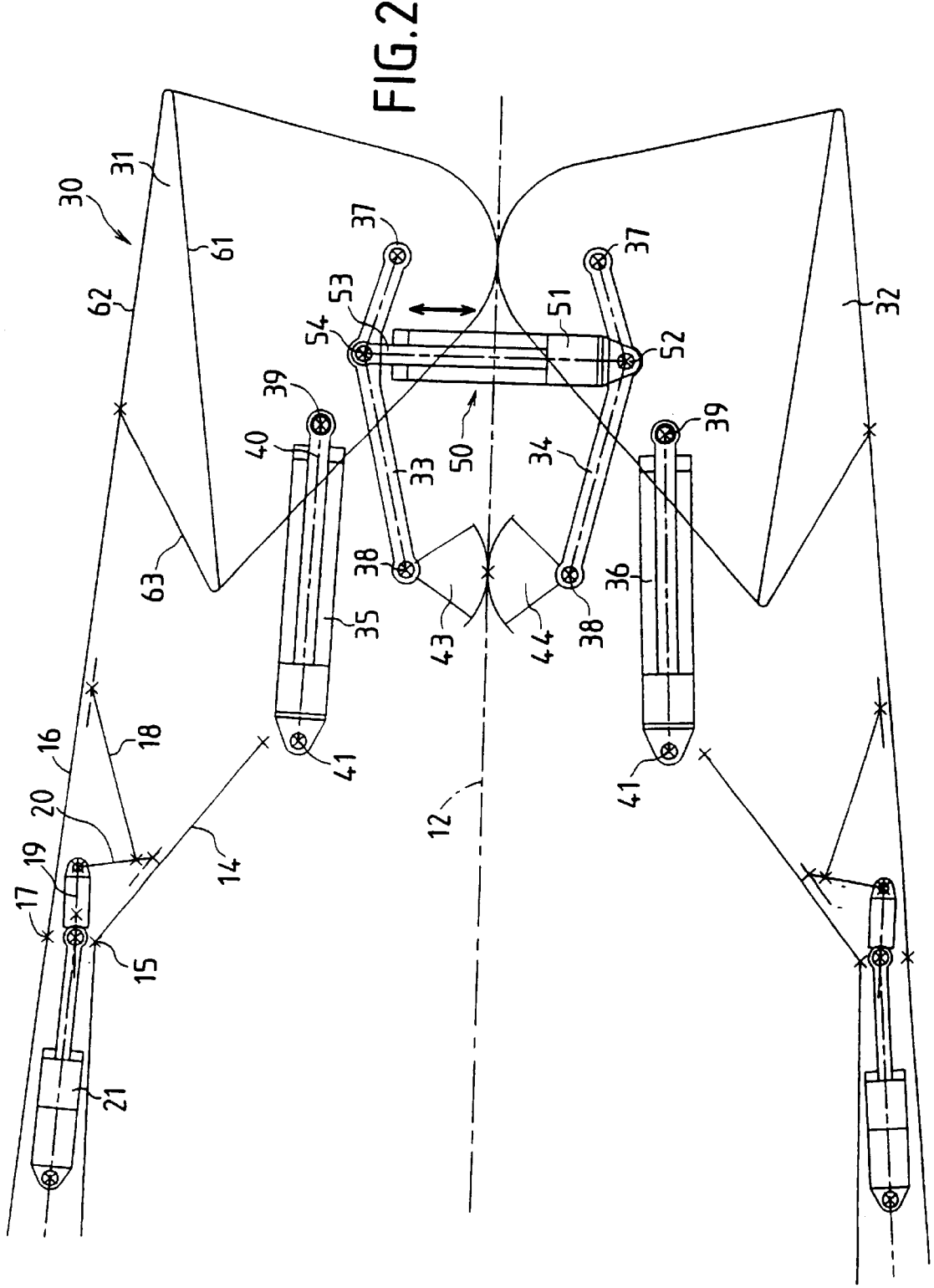
FIG. 2 shows, on an enlarged scale, a rear portion of the exhaust nozzle of FIG. 1 in the cruise mode.

When in the cruise mode shown in FIGS. 1 and 2, the cold flaps 16 slightly converge and are situated in a downstream extension of the fairing 9. In this configuration the cold flaps 16 will at most subtend an angle of 6° with the axis of revolution 12. In other configurations, the cold flaps 16 diverge outwardly.

A thrust reverser 30 is situated downstream of the hot and cold flaps 14 and 16. This thrust reverser 30 comprises two identical eyelids 31 and 32 situated symmetrically relative to a horizontal plane passing through the axis of revolution 12 and perpendicular to the vertical planes of the cross sections of FIGS. 1 through 7.

These eyelids 31 and 32 are pivotably mounted on two pairs of arms 33, 34, on two pairs of linear control actuators 35, 36 and on the stationary structure 8. Each pair of arms and each pair of linear actuators are situated laterally outside the eyelids 31 and 32 and inside a lateral extension of the stationary structure 8.

In particular, one of the eyelids 31 hinges on downstream end 37 of two upper arms 33 having upstream ends 38 which hinge on the stationary structure 8. The eyelid 31 also hinges on free ends 39 of rods 40 of the upper control actuators 35 which, in turn, hinge at pivot points 41 on the stationary structure 8. The other one of the eyelids 32 is mounted in the same manner on the two lower arms 34 and the two lower control actuators 36.

The arms 33 and 34 of at least one pair of arms preferably include mutually meshing gear sectors 43, 44 mounted at ends 38, which assure symmetrical displacement of the two eyelids 31 and 32 relative to the axial plane of symmetry via the downstream ends 37 of the arms 33, 34.

An actuator 50 is inserted between the two arms 33 and 34 of at least one pair of arms. A cylinder 51 of this actuator 50 hinges at a pivot point 52 on the lower arm 34 and has a rod 53 which hinges at another point 54 on the upper arm 33. The points 52 and 54 are symmetrical relative to the axial plane of symmetry of the eyelids 31 and 32.

Each eyelid 31, 32 preferably assumes the shape of an arch which is of triangular cross-section and which is bounded by an inner wall 61, an outer wall 62 and a front wall 63.

When in the cruise mode shown in FIGS. 1 and 2, the outer wall 62 is situated in an extension of the cold flaps 16 and preferably subtends an angle of 60 with the axis of revolution 12. The cold flaps 16 preferably run backwards over a distance substantially twice the length of the hot flaps 14. An intake cross section of the eyelids 31 and 32 is defined by a junction of the inner walls 61 and the outer walls 63 and exceeds an exhaust cross section of the hot flaps 14. The inner walls 61 constitute a diverging exhaust nozzle in the cruise mode. In this configuration, the actuator 50 and the control actuators 35 and 36 are retracted.

Figure 4:
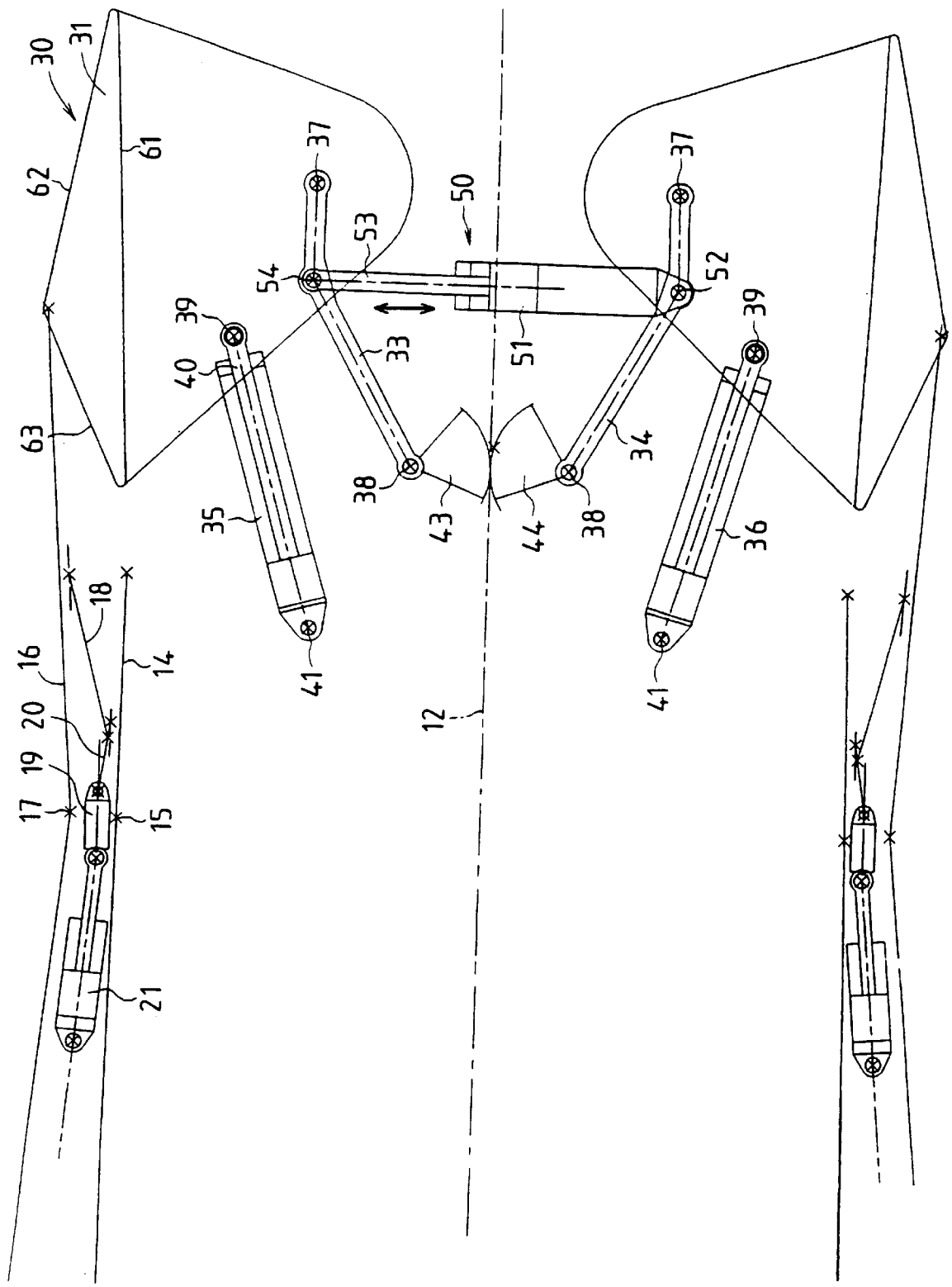
FIG. 4 shows, on an enlarged scale, the rear portion of the exhaust nozzle in the takeoff mode.

As regards the takeoff mode shown in FIGS. 3 and 4, the actuator 50 is extended and the control actuators 35 and 36 are retracted. Furthermore, the hot flaps 14 are aligned with the inner wall 7. The hinging on the downstream ends 37 of the arms 33 and 34 and the hinging on the downstream ends 39 of the control actuators 35 and 36 by the eyelids 31 and 32 are arranged in such a way in this takeoff mode that the inner walls 61 of the eyelids 31 and 32 also are situated in the extension of the inner wall 7 of the stationary structure 8. The cold flaps 16 are diverging and assure the aerodynamic continuity, without hindrance, of the fairing 9 and the outer wall 62 of the eyelids 31 and 32.

Figure 7:
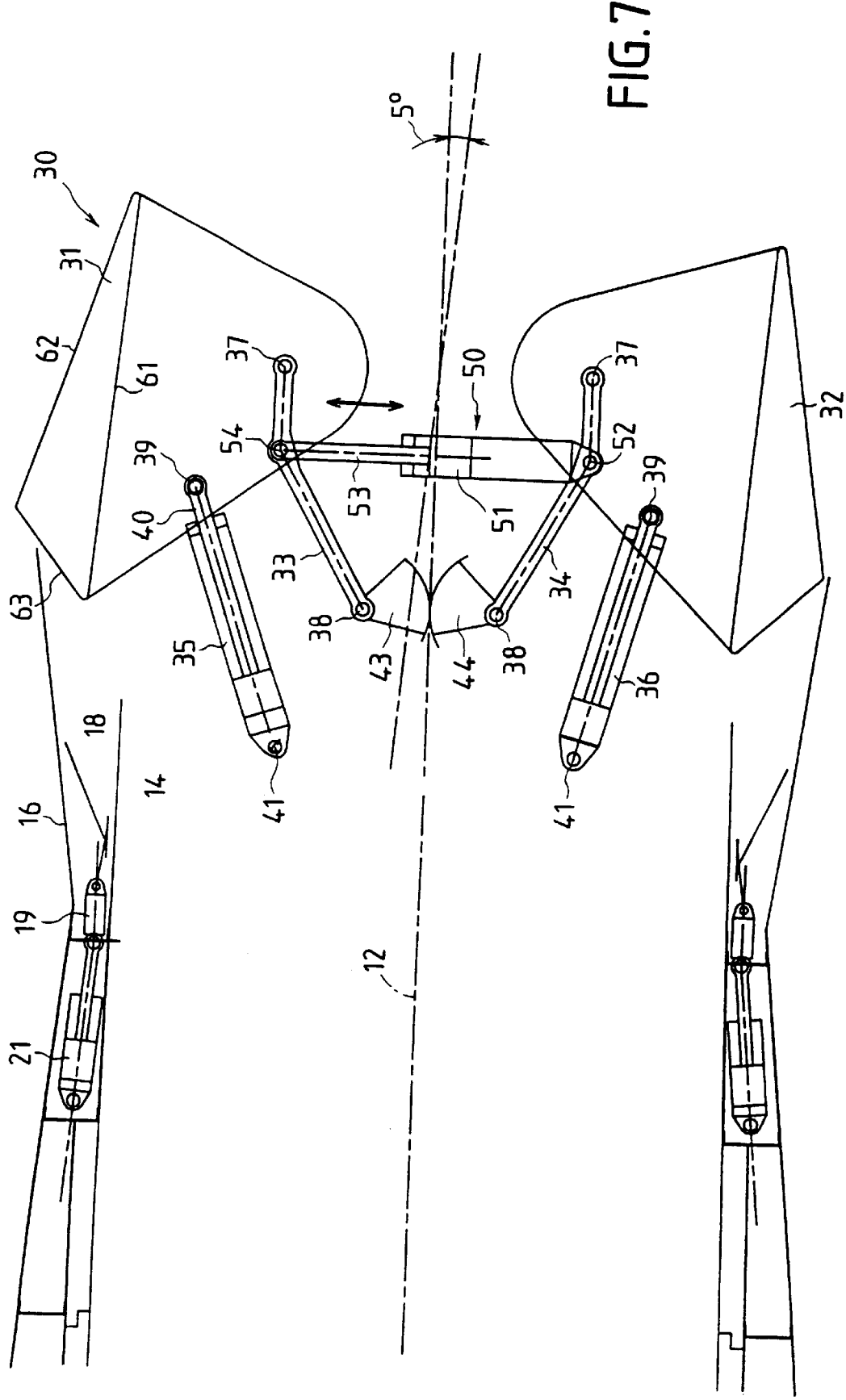
FIG. 7 is similar to FIG. 4 and shows the positions of the flaps and the actuators in the takeoff mode with deflection of the gases.

Based on the takeoff mode shown in FIGS. 3 and 4, it is possible to further retract the lower control actuator 36 and to slightly extend the upper control actuator 35 in order to slant the inner walls 61 of the eyelids 31 and 32 by about 5° relative to the axis of revolution 12 in a manner shown in FIG. 7. Thanks to this arrangement, the gasses are directed at 5° toward the ground during takeoff. This design mainly allows decreasing the surfaces of the aircraft's stabilizers and controls which are sized for the event of wing-engine failure during takeoff.

Figure 5:
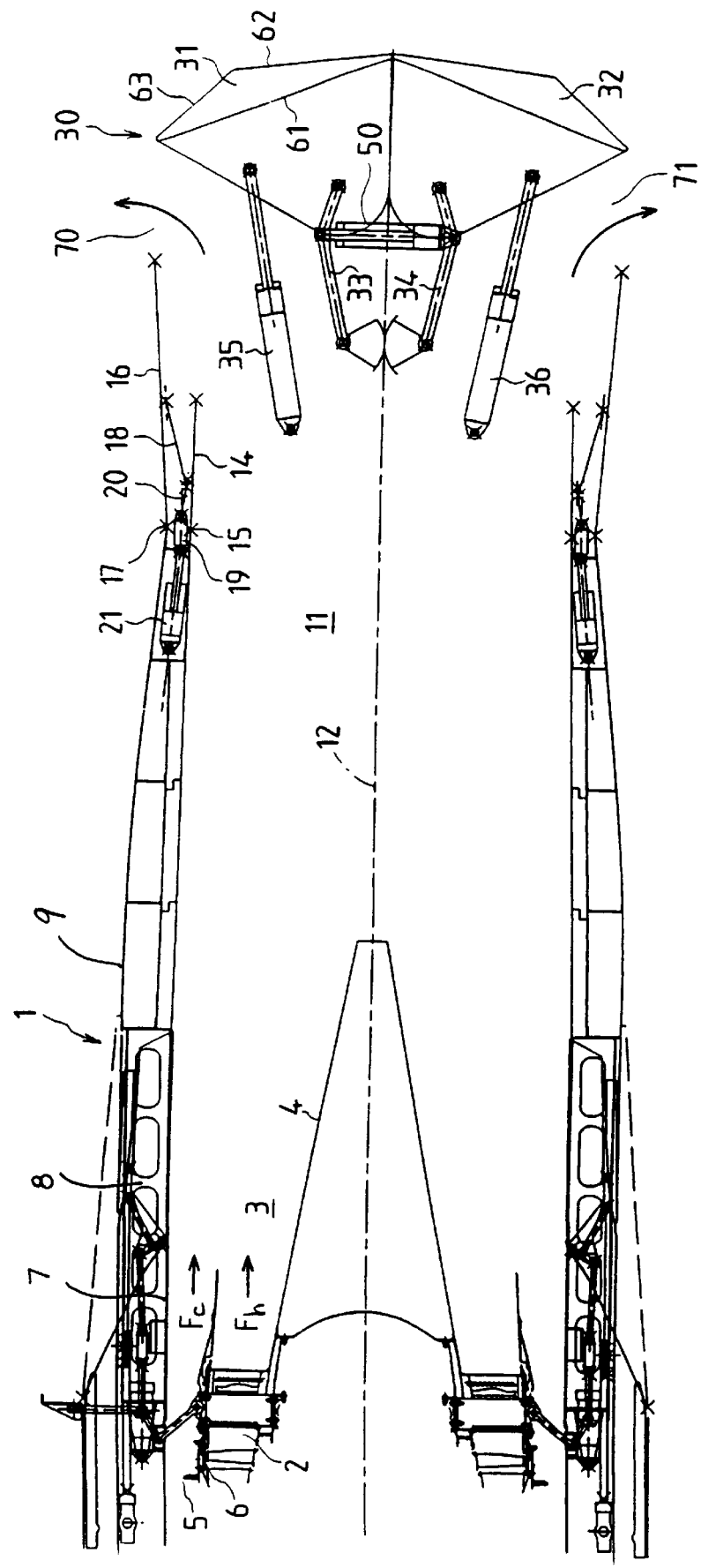
FIG. 5 is a cross-section in the vertical plane of symmetry of the exhaust nozzle of FIG. 1 in a thrust-reversal mode.
Figure 6:
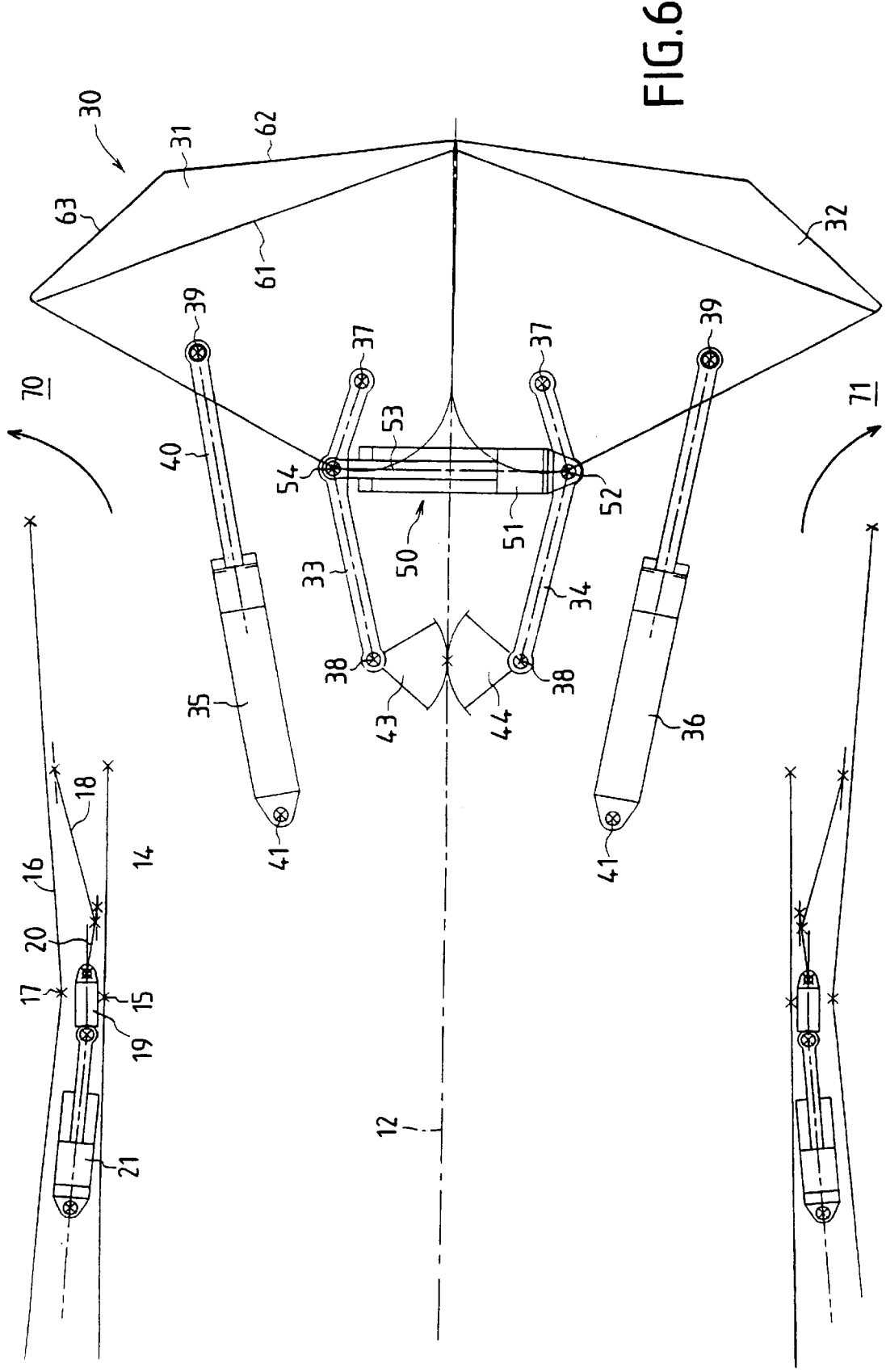
FIG. 6 shows, on an enlarged scale, the rear portion of the exhaust nozzle in the thrust reversal mode.

The function of the eyelids 31 and 32 is to implement thrust reversal during landing. For that purpose, the two eyelids 31 and 32 are pivoted by extending the control actuators 35 and 36 with the actuator 50 retracted. This thrust-reversal mode is shown in FIGS. 5 and 6, wherein the inner walls 61 of the two eyelids 31 and 32 abut at the axial plane of symmetry and deflect the gas flow issuing from the chamber 11 forward and outward, through side apertures 70, 71 between the cold flaps 16 and the eyelids 31, 32. As a result, the aircraft is decelerated. In this configuration, the hot flaps 14 are situated in the extension of the inner wall 7 of the stationary structure 8 and the cold flaps 16 diverge outward.

While the present invention has been described herein with respect to a particular preferred embodiment, it is to be understood that various modifications may be made to the present invention without departing from the spirit and scope thereof. As such, the present invention should not be considered as restricted to the disclosed embodiment, but rather should be limited in scope only by the following claims.

We claim:

1. An exhaust nozzle of a turbojet engine mounted on a supersonic aircraft, the exhaust nozzle comprising:

an external cowling formed by an inner annular wall (7) and an outer aerodynamic fairing (9), the inner annular wall (7) bounding an exhaust duct through which a gas flow passes during engine operation;

a set of hot flaps (14) mounted in a pivotable manner on a downstream end (15) of the inner annular wall (7);

a set of cold flaps (16) mounted in a pivotable manner on a downstream end (17) of the outer aerodynamic fairing (9);

a thrust reverser (30) including two eyelids (31, 32) which are mounted in a pivotable manner on opposite sides of an axial plane of symmetry and downstream of the inner annular wall (7), the eyelids (31, 32) being movable between a forward-thrust position in which the eyelids (31, 32) are situated in an extension of the cold flaps (16) and a thrust-reversal position in which the eyelids (31, 32) project into the exhaust duct to deflect the gas flow;

a first control mechanism (21) arranged to drive the hot and cold flaps (14, 16);

a second control mechanism (35, 36) arranged to drive the eyelids (31, 32) between the forward-thrust and thrust reversal positions; and a third control mechanism (50) arranged to drive the eyelids (31, 32) in a direction perpendicular to the axial plane of symmetry, whereby the eyelids (31, 32) are driven away from the axial plane of symmetry in a takeoff mode.

2. The exhaust nozzle according to claim 1 wherein the cold flaps (16) are driven to form an obstacle-free, aerodynamic profile with the eyelids (31, 32) in both a takeoff mode and in a cruise mode.

3. The exhaust nozzle according to claim 2, wherein the cold flaps (16) are connected to the hot flaps (14) by linkrods (18) such that the cold flaps (16) follow the hot flaps (14).

4. The exhaust nozzle according to claim 3, further comprising:
  two pairs of arms (33, 34), each arm (33, 34) being pivotably connected at one end (38) thereof to a stationary structure (8) of the external cowling, one arm (33) of each of the pairs of arms (33, 34) being pivotably connected at the other end (37) thereof to one eyelid (31), the other arm (34) of each of the pairs of arms (33, 34) being pivotably connected at the other end (37) thereof to the other eyelid (32), the arms (33, 34) of each pair of arms (33, 34) being arranged symmetrically with respect to the axial plane of symmetry;
  wherein the second control mechanism comprises at least one pair of hydraulic actuators (35, 36), each actuator (35, 36) of the pair of hydraulic actuators (35, 36) being pivotably connected at one end (41) thereof to the stationary structure (8), one actuator (35) of the pair of hydraulic actuators (35, 36) being pivotably connected at the other end (39) thereof to one eyelid (31), the other actuator (36) of the pair of hydraulic actuators (35, 36) being pivotably connected at the other end (39) thereof to the other eyelid (32), the hydraulic actuators (35, 36) being arranged symmetrically with respect to the axial plane of symmetry.

5. The exhaust nozzle according to claim 4, wherein the third control mechanism comprises an actuator (50) connected between one of the arms (33, 34) of each of the pairs of arms.

6. The exhaust nozzle according to claim 5, wherein at least one of the arms (33, 34) of each of the pairs of arms are connected by gear-sectors (43, 44) such that displacement of each of the eyelids (31, 32) on the arms (33, 34) is symmetrical relative to the axial plane of symmetry.

7. The exhaust nozzle according to claim 6, wherein the hydraulic actuators (35, 36) are arranged to be actuated in an opposing manner in the takeoff mode such that the eyelids (31, 32) slightly deflect the gas flow relative to the axial plane of symmetry.

8. The exhaust nozzle according to claim 1, further comprising:
  two pairs of arms (33, 34), each arm (33, 34) being pivotably connected at one end (38) thereof to a stationary structure (8) of the external cowling, one arm (33) of each of the pairs of arms (33, 34) being pivotably connected at the other end (37) thereof to one eyelid (31), the other arm (34) of each of the pairs of arms (33, 34) being pivotably connected at the other end (37) thereof to the other eyelid (32), the arms (33, 34) of each pair of arms (33, 34) being arranged symmetrically with respect to the axial plane of symmetry;
  wherein the second control mechanism comprises at least one pair of hydraulic actuators (35, 36), each actuator (35, 36) of the pair of hydraulic actuators (35, 36) being pivotably connected at one end (41) thereof to the stationary structure (8), one actuator (35) of the pair of hydraulic actuators (35, 36) being pivotably connected at the other end (39) thereof to one eyelid (31), the other actuator (36) of the pair of hydraulic actuators (35, 36) being pivotably connected at the other end (39) thereof to the other eyelid (32), the hydraulic actuators (35, 36) being arranged symmetrically with respect to the axial plane of symmetry.

9. The exhaust nozzle according to claim 8, wherein the third control mechanism comprises an actuator (50) connected between one of the arms (33, 34) of each of the pairs of arms.

10. The exhaust nozzle according to claim 9, wherein at least one of the arms (33, 34) of each of the pairs of arms are connected by gear-sectors (43, 44) such that displacement of each of the eyelids (31, 32) on the arms (33, 34) is symmetrical relative to the axial plane of symmetry.

11. The exhaust nozzle according to claim 10, wherein the hydraulic actuators (35, 36) are arranged to be actuated in an opposing manner in the takeoff mode such that the eyelids (31, 32) slightly deflect the gas flow relative to the axial plane of symmetry.

12. The exhaust nozzle according to claim 8, wherein at least one of the arms (33, 34) of each of the pairs of arms are connected by gear-sectors (43, 44) such that displacement of each of the eyelids (31, 32) on the arms (33, 34) is symmetrical relative to the axial plane of symmetry.

13. The exhaust nozzle according to claim 9, wherein the hydraulic actuators (35, 36) are arranged to be actuated in an opposing manner in the takeoff mode such that the eyelids (31, 32) slightly deflect the gas flow relative to the axial plane of symmetry.

14. The exhaust nozzle according to claim 12, wherein the hydraulic actuators (35, 36) are arranged to be actuated in an opposing manner in the take off mode such that the eyelids (31, 32) slightly deflect the gas flow relative to the axial plane of symmetry.

15. The exhaust nozzle according to claim 8, wherein the hydraulic actuators (35, 36) are arranged to be actuated in an opposing manner in the takeoff mode such that the eyelids (31, 32) slightly deflect the gas flow relative to the axial plane of symmetry.

16. The exhaust nozzle according to claim 2, further comprising:
  two pairs of arms (33, 34), each arm (33, 34) being pivotably connected at one end (38) thereof to a stationary structure (8) of the external cowling, one arm (33) of each of the pairs of arms (33, 34) being pivotably connected at the other end (37) thereof to one eyelid (31), the other arm (34) of each of the pairs of arms (33, 34) being pivotably connected at the other end (37) thereof to the other eyelid (32), the arms (33, 34) of each pair of arms (33, 34) being arranged symmetrically with respect to the axial plane of symmetry;
  wherein the second control mechanism comprises at least one pair of hydraulic actuators (35, 36), each actuator (35, 36) of the pair of hydraulic actuators (35, 36) being pivotably connected at one end (41) thereof to the stationary structure (8), one actuator (35) of the pair of hydraulic actuators (35, 36) being pivotably connected at the other end (39) thereof to one eyelid (31), the other actuator (36) of the pair of hydraulic actuators (35, 36) being pivotably connected at the other end (39) thereof to the other eyelid (32), the hydraulic actuators (35, 36) being arranged symmetrically with respect to the axial plane of symmetry.

17. The exhaust nozzle according to claim 16, wherein the third control mechanism comprises an actuator (50) connected between one of the arms (33, 34) of each of the pairs of arms.

18. The exhaust nozzle according to claim 17, wherein at least one of the arms (33, 34) of each of the pairs of arms are connected by gear-sectors (43, 44) such that displacement of each of the eyelids (31,32) on the arms (33, 34) is symmetrical relative to the axial plane of symmetry.

19. The exhaust nozzle according to claim 18, wherein the hydraulic actuators (35, 36) are arranged to be actuated in an opposing manner in the takeoff mode such that the eyelids (31, 32) slightly deflect the gas flow relative to the axial plane of symmetry.

20. The exhaust nozzle according to claim 16, wherein at least one of the arms (33, 34) of each of the pairs of arms are connected by gear-sectors (43, 44) such that displacement of each of the eyelids (31, 32) on the arms (33, 34) is symmetrical relative to the axial plane of symmetry.

21. The exhaust nozzle according to claim 17, wherein the hydraulic actuators (35, 36) are arranged to be actuated in an opposing manner in the takeoff mode such that the eyelids (31, 32) slightly deflect the gas flow relative to the axial plane of symmetry.

22. The exhaust nozzle according to claim 20, wherein the hydraulic actuators (35, 36) are arranged to be actuated in an opposing manner in the takeoff mode such that the eyelids (31, 32) slightly deflect the gas flow relative to the axial plane of symmetry.

23. The exhaust nozzle according to claim 16, wherein the hydraulic actuators (35, 36) are arranged to be actuated in an opposing manner in the takeoff mode such that the eyelids (31, 32) slightly deflect the gas flow relative to the axial plane of symmetry.

24. The exhaust nozzle according to claim 4, wherein at least one of the arms (33, 34) of each of the pairs of arms are connected by gear-sectors (43, 44) such that displacement of each of the eyelids (31, 32) on the arms (33, 34) is symmetrical relative to the axial plane of symmetry.

25. The exhaust nozzle according to claim 24, wherein the hydraulic actuators (35, 36) are arranged to be actuated in an opposing manner in the takeoff mode such that the eyelids (31, 32) slightly deflect the gas flow relative to the axial plane of symmetry.

26. The exhaust nozzle according to claim 4, wherein the hydraulic actuators (35, 36) are arranged to be actuated in an opposing manner in the takeoff mode such that the eyelids (31, 32) slightly deflect the gas flow relative to the axial plane of symmetry.

27. The exhaust nozzle according to claim 5, wherein the hydraulic actuators (35, 36) are arranged to be actuated in an opposing manner in the takeoff mode such that the eyelids (31, 32) slightly deflect the gas flow relative to the axial plane of symmetry.

* * * * *